Dec. 29, 1970  F. S. DYE, JR  3,550,321
ELECTRICAL CONTROL ARRANGEMENT
FOR A SANDBLASTING MACHINE
Filed Jan. 9, 1969  3 Sheets-Sheet 1

INVENTOR
FLOYD S. DYE, JR.

BY
ATTORNEYS

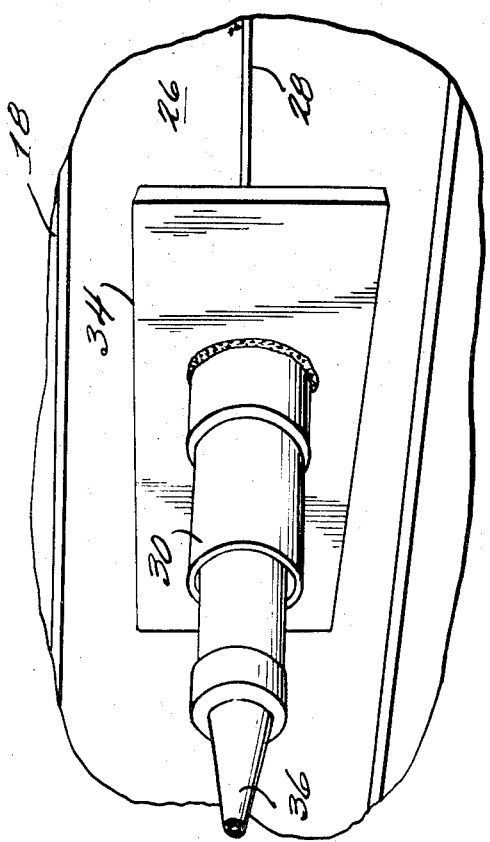
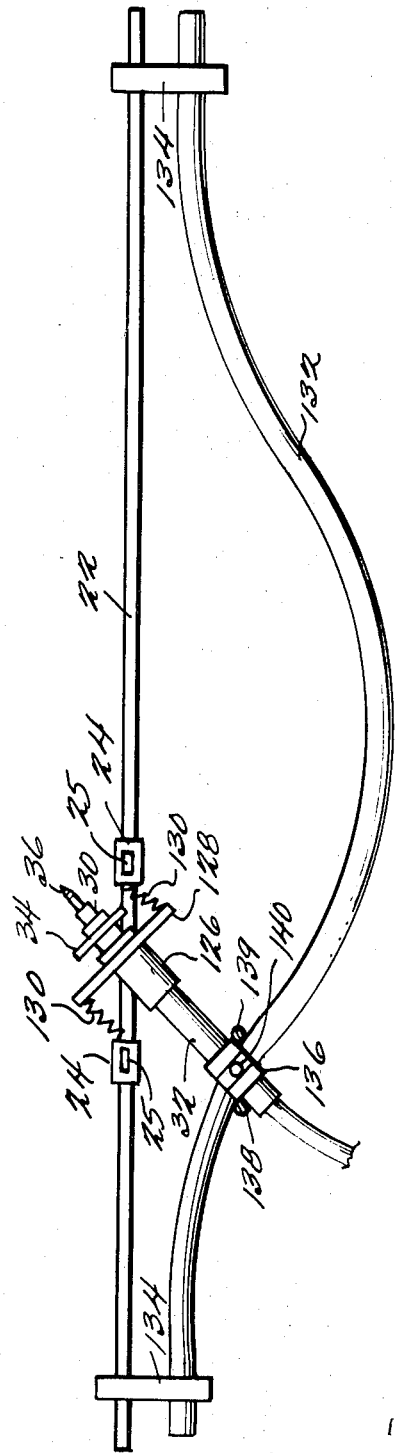

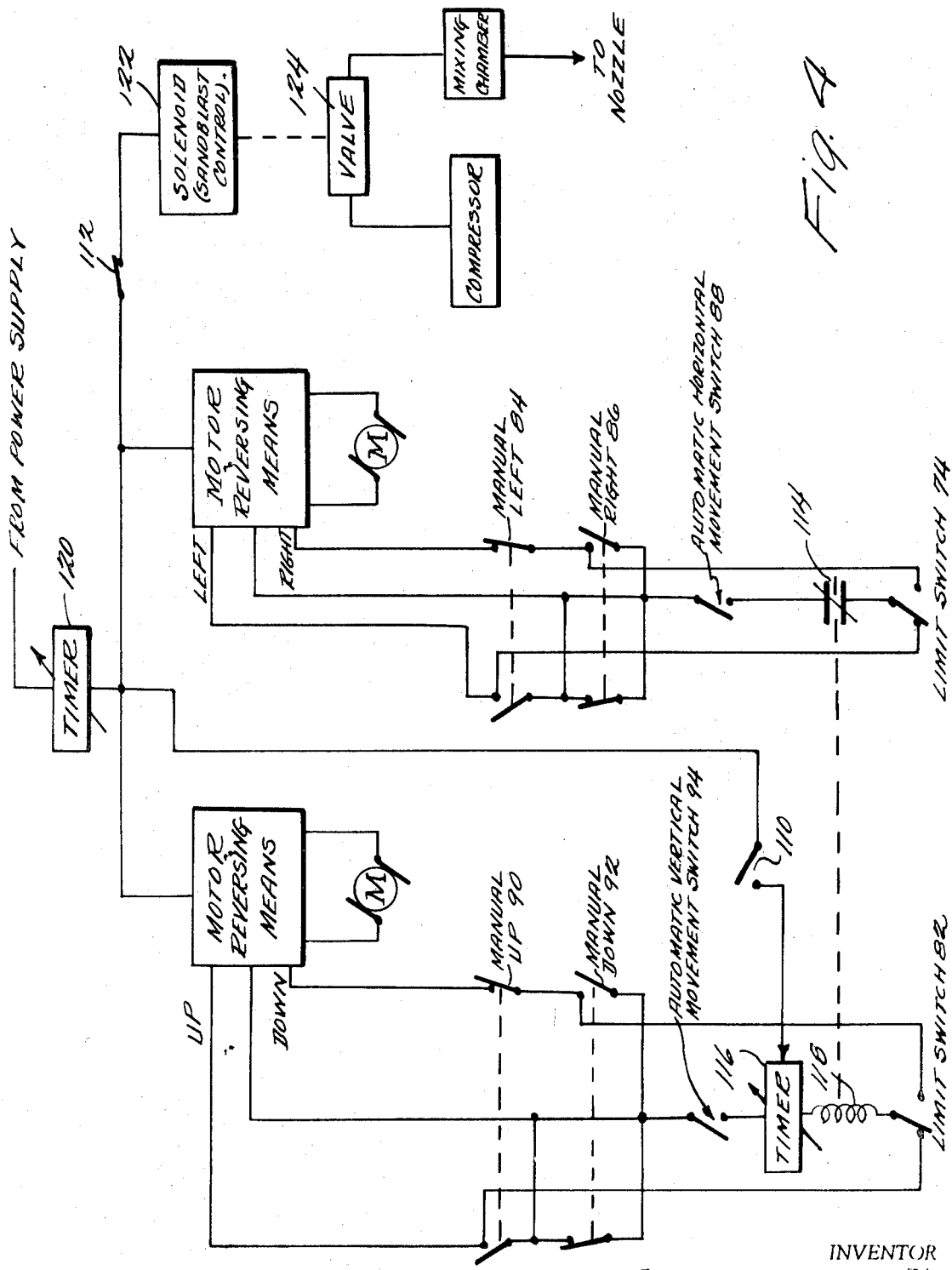

United States Patent Office 3,550,321
Patented Dec. 29, 1970

3,550,321
ELECTRICAL CONTROL ARRANGEMENT FOR A SANDBLASTING MACHINE
Floyd S. Dye, Jr., Rte. 1, Elberton, Ga. 30635
Filed Jan. 9, 1969, Ser. No. 789,978
Int. Cl. B24c 3/00
U.S. Cl. 51—8
8 Claims

ABSTRACT OF THE DISCLOSURE

Apparatus for electrically controlling the position of the nozzle of a sandblasting machine. The control is operated either manually or automatically. A first reversible motor is utilized to cause horizontal movement of the nozzle and a second reversible motor moves the nozzle vertically. Rotation of the motors is dictated either directly from an electrical control panel or automatically by limit switches responsive to nozzle location. A solenoid valve in a sandblast generation station is provided to interrupt flow of compressed air in the absence of electrical power to the control arrangement thereby protecting the workpiece from damage by excess sandblast. Timing devices and special contour guides are employed to establish the components of movement of the nozzle and to properly position the nozzle with respect to the workpiece when the latter is not a flat surface.

---

The present invention is an improvement of the electrical control arrangement for a sandblasting machine disclosed in Pat. No. 3,391,494 which issued on July 9, 1968. The improvements can be summarized as follows:

(1) the provision of an automatic timer for supplying power to the machine to thereby permit the operator to devote his attention to other work;

(2) control of the movement of the nozzle bearing carriage to describe rectilinear paths in the horizontal and vertical directions;

(3) the employment of auxiliary nozzle guides to permit the machine to operate on work surfaces which are not flat;

(4) the use of an arrangement for shutting down the sandblast generator in the event of power failure; and (5) the incorporation of an arrangement for periodically choking the sandblast supply to reduce the adverse effects of moisture which tends to cake the sand.

Briefly, these improvements are achieved by including a timer between the power supply and the two reversible electric motors which drive the nozzle in the horizontal and vertical directions, respectively. A further timer and relay arrangement is employed to prevent one of the motors from being operated while the other is energized. The nozzle is carried on a floating suspension so that when connected to an auxiliary guide shaped in conformity with a work surface, the nozzle is manipulated to always direct the sandblast normal to the surface. A solenoid valve is responsive to interruption of the main power supply to prevent compressed air from being mixed with sand. This valve is also actuated by a separate off-on switch to periodically interrupt the compressed air flow for very short periods so that on resumption of the compressed air supply, the sand is impacted with considerable force which serves to prevent the sand from caking due to moisture.

The entire scope of the invention will become more fully apparent when considered in light of the following detailed description of an illustrative embodiment of the invention and from the appended claims.

The illustrative embodiment may be best understood by reference to the accompanying drawings, wherein:

FIG. 2 is a fragmented view in perspective of the nozzle arrangement on the opposite side of the sandblasting machine from that observable in FIG. 1;

Figure 1:
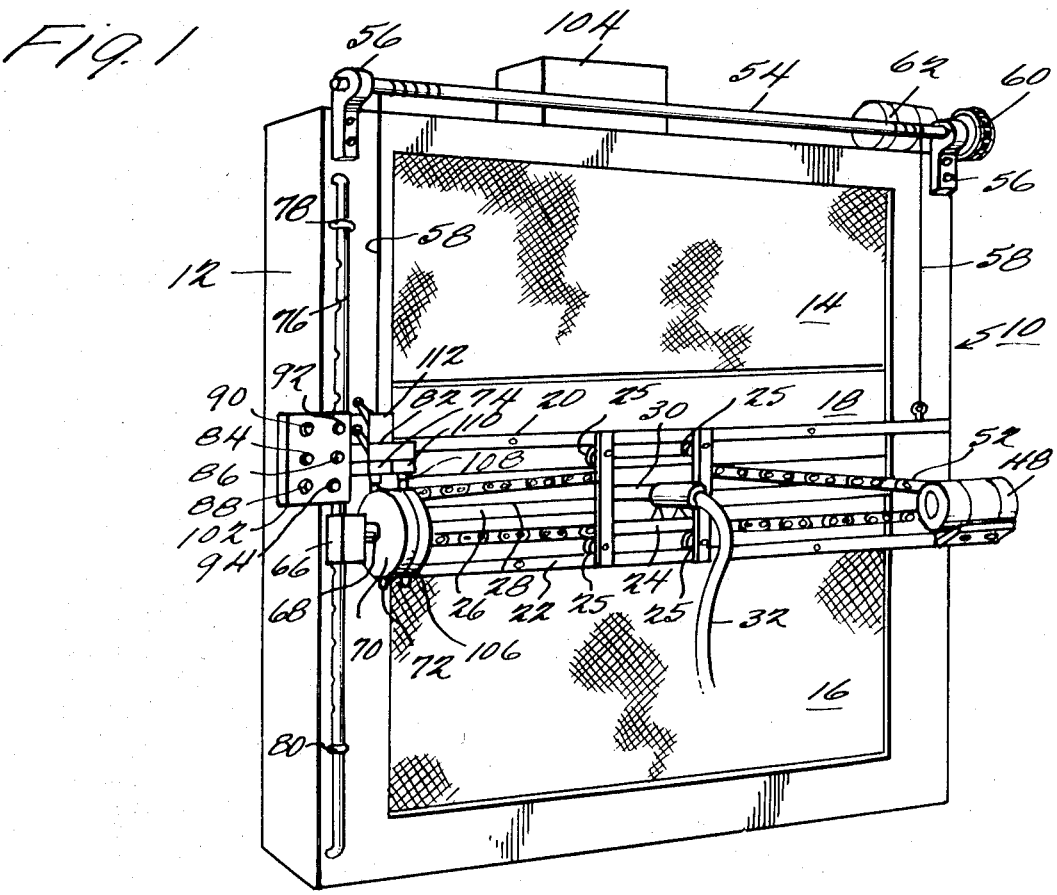
FIG. 1 is a view in perspective of a sandblasting machine incorporating the electrical control arrangement of the invention.

FIG. 4 is a block diagram of one form which the electrical control circuitry may take, together with its relationship to the nozzle-driving electric motors and the sandblast supply; and FIG. 5 is a fragmented, enlarged top plan view of an alternative nozzle supporting and guiding arrangement which may be substituted for the arrangement of FIG. 1 to permit the nozzle to be properly related to a work surface that is other than flat. In this figure rail 20 is removed for convenience of illustration.

Referring now to the drawings, the structure of the sandblaster will first be described in detail. In FIG. 1 there is illustrated a conventional sandblasting machine curtain generally indicated at 10. This curtain comprises a main frame 12 for supporting two spaced, flexible curtain portions 14 and 16. The bottom edge of curtain portion 14 and the top edge of curtain portion 16 are joined by a plate member 18. A pair of spaced horizontally extending rail members 20 and 22 are suitably attached to plate 18. A carriage assembly 24 having grooved wheels 25 is supported between rails 20 and 22. The wheels permit the carriage to be moved along the rails in a horizontal path. Plate 18 is provided with a horizontally extending slot (not shown) which is covered with a flexible sealing element 26 having a slit 28 along the length thereof. A sandblast nozzle 30 is supported by carriage 24 and projects through the slit 28. The details of an improved nozzle supporting arrangement for use on surfaces which are other than flat will be described hereinafter with respect to FIG. 5. A flexible hose 32 serves to carry sand under high pressure from a compression source to nozzle 30.

FIG. 2 illustrates the details of the nozzle portion which projects through the slit in flexible sealing element 26. A deflection plate 34 is attached to the nozzle in closely spaced relationship with respect to element 26. Plate 34 and element 26 insure that sand exiting from nozzle tip 36 cannot be deflected back through the opening in plate 18 through which the nozzle projects.

Now that structure of the sandblasting apparatus has been described, attention will be directed to the control mechanisms for positioning the sandblasting nozzle 30. In this regard, reference will be made to FIGS. 1 and 3. A reversible drive motor 48 is fixed to the lower horizontal rail 22 at one end thereof. A driving element in the form of a sprocket (not shown) is appropriately connected to the drive shaft of motor 48. An additional sprocket 50 (FIG. 3) which serves as a rotatable guide element is supported between rails 20 and 22 at the opposite end of rail 22 from that to which motor 48 is mounted. A flexible length of chain 52 is joined at one of its ends to one side of carriage 24. This chain passes over the sprocket associated with motor 48, past carriage 24, around sprocket 50, and back to carriage 24 where its other end is connected to the side of the carriage opposite that to which the first chain end is connected. From the foregoing description it is apparent that as motor 48 is driven in forward or reverse directions, the carriage 24 is moved horizontally along rails 20 and 22.

In addition to horizontal movement, the carriage 24 also may be translated vertically. This is accomplished by journalling a horizontally extending shaft 54 in support elements 56 mounted at the top, and at opposite sides, of main frame 12. Shaft 54 is connected to the upper rail 20 of the carriage supporting arrangement by means of cables 58 positioned close to the ends of shaft 54. A gear 60 mounted at one end of shaft 54 is suitably interconnected with the drive shaft of a reversible motor 62 fixed to frame 12. As this motor is operated, shaft 54 is rotated to either wind cables 58 thereabout to raise the nozzle-supporting carriage 24, or to unwind the cables thereby lowering the carriage.

It should be understood that curtain portion 14 is preferably supplied from a roll fixed to frame 12 near the top so that as carriage 24 is lowered, curtain material is unrolled, whereas when carriage 24 is raised, curtain material is wrapped on the roll. Curtain portion 16 is similarly supplied from a roll fixed to frame 12 near its bottom.

Figure 3:
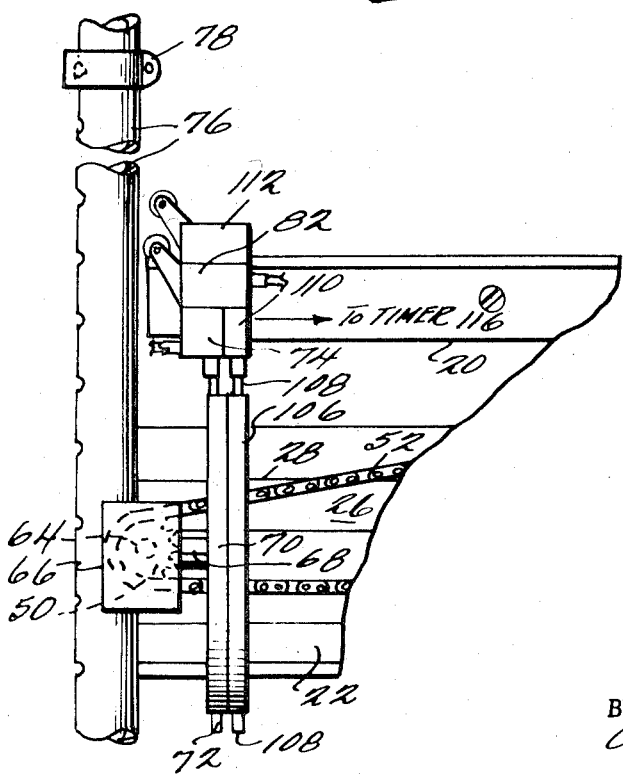
FIG. 3 is a fragmented, enlarged view of the movement limiting arrangement for the nozzle, the control panel 102 of FIG. 1 being omitted for convenience of illustration.

The invention provides, as is most clearly illustrated in FIG. 3, means for controlling the limits of travel of the nozzle-supporting carriage 24 in the horizontal and vertical directions. With respect to the former, this is accomplished by extending the shaft 64, which carries sprocket 50, to a gear reduction box 66. The output shaft 68 from box 66 is connected to a disk 70 to rotate same. Since the rotation of sprocket 50 is dependent on that of motor 48, the appropriate selection of gears in box 66 results in disk 70 rotating in proportion to the horizontal travel of the carriage 24. This fact is utilized by selectively attaching projecting cam elements 72 to the circumferential edge of disk 70. The selective positioning of elements 72 is performed by the operator who manually moves the carriage horizontally to the desired limits of travel for the particular workpiece to be operated upon and sets the cam elements in positions which, during automatic operation, will permit the carriage to move horizontally only within these limits. A limit switch 74, attached to rail 20, is placed in the path of these cam elements. Thus, during automatic operation of the equipment, each time a cam element 72 engages limit switch 74, motor 48 reverses to cause the nozzle to change its direction of movement. This operation will be described in detail hereinafter.

Shaft 68 also carries an additional disk 106 having cam elements 108 projecting from the circumferential edge of this disk. An additional switch 110, attached to rail 20, is positioned in the path of cam elements 108. Switch 110 has its output connected to a timer 116 such that the timer is set each time the switch is actuated. Cam elements 108 are positionally related to elements 72 as will be described hereinafter.

To control the limits of vertical movement of the nozzle, a vertically extending bar 76 is mounted on frame 12. A pair of cams 78 and 80 are selectively positioned in spaced relationship along bar 76. These cams are located in the path of a limit switch 82. In a fashion similar to that described with respect to switch 74, the actuation of switch 82 results in the reversal of motor 62 to change the direction of vertical movement of the nozzle.

An additional switch 112 is mounted adjacent switch 82 such that as switch 112 engages cam 78, the switch is briefly opened to temporarily interrupt power to the sandblast generator for a purpose which will be discussed with respect to the following description of FIG. 4.

The basic mechanical structure of the invention having been discussed, an electrical system for implementing either manually or automatically controlled movement of the nozzle will be described. In this regard, a representative circuit is illustrated in FIG. 4. The circuit schematically illustrates identical arrangements for manually controlling each of the reversible motors 48 and 62. For convenience of description, only the system for motor 48 will be detailed. The motor 48 is connected to motor reversing means which in practice may take many forms. For example, a magnetic switch could be employed, the actuation of which changes the sense of energization of the reversible motor's field thereby reversing its operation. The motor reversing means is controlled by the selective actuation of a manual left switch 84 and a manual right switch 86. These switches are illustrated in FIG. 1 as being of the conventional pushbutton type. Switches 84 and 86 each comprise a ganged contact pair arranged such that the closing of one contact of each pair results in the opening of the other contact. Since each contact is in a separate energizing path to the motor reversing means, such an arrangement insures that only one path to the reversing means can be completed. The illustrated positions of switches 84 and 86 are those which exist when the system is at rest. When it is desired to manually move the nozzle to the left, switch 84 is actuated to complete a first current path to the motor reversing means. For movement to the right, the same procedure would be followed except that switch 86 would be operated.

Of course, the manual operation of the vertical movement control means is the same as that for horizontal movement. The manual up and manual down switches are designated as 90 and 92, respectively.

For automatic control, switches 88 and 94 (FIGS. 1 and 4) are closed. Switch 88 is the automatic horizontal movement switch and switch 94 is the automatic vertical movement switch. Closure of switch 88 completes a circuit through a normally closed relay contact 114 to either the left or right portion of the horizontal motor reversing means, depending on the position of limit switch 74. When timer 116 is set with switch 94 closed, a circuit is completed through relay coil 118 and limit switch 82 to either the up or down portion of the vertical motor reversing means, depending on the position of switch 94. Coil 118 is associated with contact 114 such that the latter is opened when the coil is energized. Switch 110 is connected between the power supply and timer 116 such that each actuation of switch 110 sets timer 116 for a predetermined period.

In describing the automatic operation it will be assumed that switch 110 is in an open condition. Closure of switches 88 and 94, with switch 74 in the position shown, first causes the nozzle to move to the left until cam elements 72 and 108 substantially simultaneously engage their respective switches 74 and 110. Closure of switch 110 sets timer 116 to complete a circuit to raise the nozzle. During this step, coil 118 is energized to open contact 114 thereby preventing horizontal movement of the nozzle. On completion of the time period set into timer 116, the circuit to the vertical motor is interrupted and coil 118 is deenergized. Thus, contact 114 closes to complete the circuit to the horizontal motor which now moves the nozzle to the right as switch 74 has been reversed. The foregoing steps are repeated until the upper vertical limit is reached at which time switch 82 is reversed to cause downward increments of motion to the nozzle.

From the foregoing it can be seen that the arrangement illustrated schematically in FIG. 4 allows rectilinear movement of the nozzle since the nozzle moves only horizontally to one end of its travel and then moves only vertically before returning in a straight horizontal path. Such nozzle motion produces more uniform sandblasting than a system in which the nozzle has compound simultaneous movement in the horizontal and vertical planes.

As stated previously, the length of the horizontal path is determined by the settings of cam elements 72. The extent of vertical movement is established by the selection of the period which timer 116 is on each time switch 110 closes.

FIG. 4 also illustrates an additional timer 120 between the power supply and the rest of the circuitry. This timer may be set by the operator to supply power to the sandblaster for any desired period thereby permitting the operator to attend to other duties with the knowledge that the machine will shut off at the end of the selected time.

In order to insure that loss of power to the nozzle movement control will not cause the workpiece to be ruined by the blast of sand to a particular area of the work surface, a solenoid valve is provided in the system. Solenoid 122 is connected to be energized by the power supply to thereby hold its associated valve 124 open. This permits compressed air from a compressor to pass through the valve to a mixing chamber where it mixes with sand which is carried by the compressed air to the nozzle. When power fails, solenoid 122 is deenergized to close valve 124 thereby shutting off the supply of compressed air to the mixing chamber.

It is often the case that the generation of the sandblast is hindered by moist sand which tends to cake. The periodic actuation of switch 112 (described hereinbefore) serves to purposely temporarily interrupt or choke the supply of compressed air to the mixing chamber through the agency of the solenoid valve. This situation is created so that when valve 124 is opened after its brief closure, the surge of compressed air to the mixing chamber breaks up the caked sand to insure a uniform sandblast.

FIG. 5 illustrates an improved nozzle supporting arrangement which may be used in place of that shown in FIG. 1. More particularly, nozzle hose 32 is supported by a sleeve 126 attached to a plate 128. Plate 128 is pivotally connected at its top and bottom to the horizontal support members (FIG. 1) of carriage assembly 24. The sides of plate 128 are joined by springs 130 to the vertical support members of carriage assembly 24. Accordingly, nozzle 30 is free to pivot in a horizontal plane.

A pair of spaced rail members 132 are connected to the rails on which carriage assembly 22 moves. Since rail 20 is omitted from FIG. 5 for convenience of illustration, its corresponding rail 132 is also absent. However, it can be seen that each rail 132 is connected to its associated rail 20 or 22 by means of support members 134. A nozzle hose holder 136 is slidingly supported between rails 132 by guide rollers 138 and 139 and by self-aligned bearings 140. Holder 136 also receives nozzle hose 32. Rails 132 are conformed to correspond to the curvature of nonflat work surfaces upon which the sandblast is to be directed. Sleeve 126 and holder 136 are designed to slidingly receive nozzle hose 32 and each is provided with means (not shown) to lock the nozzle hose against sliding. As the carriage 24 is moved horizontally along rails 20 and 22, hose holder 136 slides along rails 132. With the nozzle hose locked in holder 136, nozzle 30 is caused to pivot against the force of springs 130, which try to keep plate 128 in the plane of rails 20 and 22. As a result, the direction of the sandblast is held normal to the area of the curved work surface upon which the sandblast falls, and the nozzle hose slides with respect to sleeve 126 to keep the nozzle tip 36 at a constant distance from the work surface. This insures a uniform sandblasting operation.

The rails 132 may be retained on the machine when a flat work surface is being operated upon. In these circumstances the nozzle hose is locked in sleeve 126 and is released at holder 136, so that hose 32 may slide with respect to the latter thereby permitting plate 128 to remain in the plane of rails 20 and 22 under the influence of springs 130.

For the purposes of clarity, FIG. 1 does not illustrate the electrical connections between the various components. However, it should be appreciated that the various switches hereinbefore described are connected to box 104 located at the top of the sandblasting machine. Box 104 contains the motor reversing means for the motors 48 and 62, as well as the connections from the control arrangement to the power supply. Of course, each reversing means is also electrically connected from box 104 to its respective motor.

From the foregoing description it is apparent that the present invention provides an electrical control for a sandblasting machine which permits the nozzle to be moved independently in the vertical and horizontal directions either under manual control or automatically. It also permits the machine to operate on work surfaces that are not flat. Due to the compactness of the equipment required for electrical control, the travel of the nozzle-supporting carriage 24 extends over substantially the full width and height of the machine, without requiring structure which extends significantly beyond the machine. The sandblast cutoff arrangement insures that the workpiece will not be damaged in the event of power supply interruption to the electrical control system; and it also permits the sandblast generator to be choked to produce a constant blast of sand even in a high moisture state.

The above-described embodiment is illustrative of a preferred embodiment of the invention but is not intended to limit the possibilities of insuring the features of full nozzle travel at constant speed. For example, many other arrangements for the limit switches are possible. It should also be appreciated that although the invention described herein is particularly adaptable to lettering or otherwise carving on stone, it is applicable to other environments in which comminuted abrasive materials are directed under high pressure towards a work surface for eroding or cleaning same. The structure disclosed herein is an example of an arrangement in which the inventive features of this disclosure may be utilized, and it will become apparent to one skilled in the art that certain modifications may be made within the spirit of the invention as defined by the appended claims.

I claim:

1. In a machine for directing comminuted abrasive material through a nozzle towards a workpiece, an electrical arrangement connected to a power supply for controlling the travel of a nozzle-supporting carriage in the horizontal and vertical directions, said arrangement including:
   a first reversible electric motor operatively connected to said carriage for moving same in a horizontal direction;
   a second reversible electric motor operatively connected to said carriage for moving same in a vertical direction;
   a circuit associated with each of said motors for energizing the respective motor in a sense determinative of the direction of carriage movement;
   a limit switch in each of said circuits;
   adjustable cam means for selectively actuating said limit switches in response to carriage movement to control the sense of motor energization;
   and means interconnecting said circuits for alternately disabling one circuit while the other is energized thereby effecting rectilinear movement of the carriage alternately in the horizontal and vertical directions.

2. In a machine according to claim 1, said interconnecting means including:
   an additional limit switch; and
   a further adjustable cam means for selectively actuating the additional limit switch in response to carriage movement to actuate a timer in one of said circuits to permit energization of said one circuit for a prescribed period.

3. In a machine according to claim 1, an adjustable timer connected between the power supply and the electrical arrangement.

4. In a machine according to claim 1 wherein said comminuted abrasive material is directed to the nozzle from a chamber in which the material is mixed with air received from a compressor, the machine including an arrangement for terminating the flow of material from the nozzle when the power supply is interrupted, said terminating arrangement comprising:
   a valve interposed between the compressor and the mixing chamber; and
   a solenoid electrically connected to the power supply and joined to said valve, said solenoid being operative on interruption of the power supply to close said valve thereby preventing air from the compressor from reaching the mixing chamber.

5. In a machine according to claim 4:
an additional switch in the electrical connection betwen the power supply and the solenoid; and
means responsive to the movement of one of said carriages for temporarily opening said additional switch to briefly interrupt the supply of power to said solenoid thereby temporarily preventing air from the compressor from reaching the mixing chamber.

6. In a machine for directing comminuted abrasive material through a nozzle towards a workpiece, said nozzle being transported by a carriage having a nozzle support means and adapted to move along a horizontally extending rail assembly, an improvement for permitting said machine to operate on a workpiece having a surface which is curved, comprising:
an additional horizontally extending rail assembly joined to said machine in spaced relationship with respect to the first-mentioned assembly and having a curvature corresponding to that of said surface; additional support means for said nozzle operatively related to said additional assembly and movable therealong;
said first-mentioned support means being adapted to slidingly receive said nozzle and being pivotally attached to the carriage to permit pivoting of the nozzle in the horizontal plane.

7. In a machine according to claim 6, spring means connected between the first-mentioned support means and said carriage to exert forces tending to oppose the pivoting of the nozzle.

8. In a machine according to claim 6, the nozzle being slidingly received in said additional support means, and locking means for selectively preventing sliding of the nozzle in either of the support means.

References Cited
UNITED STATES PATENTS 3,391,494   7/1968   Dye _____ 51—8
3,436,866   4/1969   Nye _____ 51—8

LESTER M. SWINGLE, Primary Examiner